United States Patent
Choi et al.

(10) Patent No.: US 12,322,789 B2
(45) Date of Patent: Jun. 3, 2025

(54) ACTIVE MATERIAL-FREE COMPOSITE ANODE FOR ALL-SOLID-STATE BATTERY AND METHOD OF MANUFACTURING SAME

(71) Applicants: HYUNDAI MOTOR COMPANY, Seoul (KR); KIA CORPORATION, Seoul (KR)

(72) Inventors: Seung Ho Choi, Hanam-si (KR); Sang Heon Lee, Yongin-si (KR); Yun Sung Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 658 days.

(21) Appl. No.: 17/688,059

(22) Filed: Mar. 7, 2022

(65) Prior Publication Data

US 2022/0302437 A1    Sep. 22, 2022

(30) Foreign Application Priority Data

Mar. 17, 2021  (KR) .................. 10-2021-0034464

(51) Int. Cl.
*H01M 4/36* (2006.01)
*H01M 4/134* (2010.01)
(Continued)

(52) U.S. Cl.
CPC ........... *H01M 4/364* (2013.01); *H01M 4/134* (2013.01); *H01M 4/1395* (2013.01); *H01M 4/38* (2013.01);
(Continued)

(58) Field of Classification Search
CPC ........ H01M 4/134; H01M 4/38; H01M 4/483; H01M 4/58; H01M 4/622; H01M 10/052;
(Continued)

(56) References Cited

U.S. PATENT DOCUMENTS

| 2006/0019168 A1* | 1/2006 | Li | H01M 4/664 |
| | | | 429/188 |
| 2019/0379056 A1* | 12/2019 | Chen | H01M 10/052 |
| 2020/0144599 A1* | 5/2020 | Lee | H01M 4/602 |

FOREIGN PATENT DOCUMENTS

| KR | 10-2018-0091678 A | 8/2018 | |
| WO | WO-2022000292 A1 * | 1/2022 | H01M 10/052 |

OTHER PUBLICATIONS

Nanping Deng, Yong Liu, Quanxiang Li, Jing Yan, Weiwei Lei, Gang Wang, Liyuan Wang, Yueyao Liang, Weimin Kang, Bowen Cheng, Functional mechanism analysis and customized structure design of interlayers for high performance Li—S battery, Energy Storage Materials, vol. 23,2019, pp. 314-349 (Year: 2019).*

(Continued)

*Primary Examiner* — Christopher P Domone
*Assistant Examiner* — Sarah Arimintia Applegate
(74) *Attorney, Agent, or Firm* — Morgan Lewis & Bockius LLP

(57) ABSTRACT

A composite anode for an all-solid-state battery, the composite anode having no active anode material is provided. Specifically, the anode includes: an anode current collector; and a protective layer positioned on the anode current collector, and including a metallic compound and a metal alloyable with lithium, wherein the metallic compound includes at least one selected from the group consisting of a metal oxide, a metal carbide, and a combination thereof.

17 Claims, 5 Drawing Sheets

(51) Int. Cl.
*H01M 4/1395* (2010.01)
*H01M 4/38* (2006.01)
*H01M 4/48* (2010.01)
*H01M 4/58* (2010.01)
*H01M 4/62* (2006.01)
*H01M 10/052* (2010.01)
*H01M 10/058* (2010.01)
*H01M 10/0585* (2010.01)
*H01M 4/02* (2006.01)

(52) U.S. Cl.
CPC ............ *H01M 4/483* (2013.01); *H01M 4/58* (2013.01); *H01M 4/62* (2013.01); *H01M 4/622* (2013.01); *H01M 10/052* (2013.01); *H01M 10/0585* (2013.01); *H01M 2004/021* (2013.01); *H01M 2004/027* (2013.01)

(58) Field of Classification Search
CPC .. H01M 10/0585; H01M 4/366; H01M 4/667; H01M 2300/0094
See application file for complete search history.

(56) References Cited

OTHER PUBLICATIONS

S. Saha, B.M. Rajbongshi, V. Ramani, A. Verma, Titanium carbide: An emerging electrocatalyst for fuel cell and electrolyser, International Journal of Hydrogen Energy, vol. 46, Issue 24,2021, pp. 12801-12821, ISSN 0360-3199,https://doi.org/10.1016/j.ijhydene.2021.01.116. (Year: 2021).*
Translated WO-2022000292-A1 (Year: 2022).*

* cited by examiner

ACTIVE MATERIAL-FREE COMPOSITE ANODE FOR ALL-SOLID-STATE BATTERY AND METHOD OF MANUFACTURING SAME

CROSS REFERENCE TO RELATED APPLICATION

The present application claims priority to Korean Patent Application No. 10-2021-0034464, filed Mar. 17, 2021, the entire contents of which is incorporated herein for all purposes by this reference.

TECHNICAL FIELD

The present disclosure relates to a composite anode for an all-solid-state battery, the composite anode having no active material.

BACKGROUND

In order to use environmentally friendly energy, an energy storage system is needed. As a typical example of the energy storage system is a lithium-ion battery. Depending on application fields of lithium-ion batteries, the lithium-ion batteries are required to have various properties such as high energy density, long lifetime, fast-charging/discharging, and high driving performance under high-temperature and low-temperature.

Recently, in order to solve environmental problems due to carbon dioxide, it is required to avoid the use of fossil fuels. Accordingly, in the automotive industries, there is drastically increasing interest in electric vehicles in which lithium-ion batteries are utilized. A currently developed lithium-ion battery can move a vehicle about 400 km on a single charge, but there are problems due to the use of liquid electrolytes, which suffer from instability at high temperature and fire.

Recently, in order to overcome the problems of lithium-ion batteries, research on all-solid-state batteries using solid electrolytes has been actively conducted. The all-solid-state batteries are based on technology that excludes organic solvents such as liquid electrolytes, so that the all-solid-state batteries have been attracting attention because cells can be manufactured in a safe and simple form.

In addition, recently, research has been conducted on an anodeless-type battery that removes an anode of an all-solid-state battery and directly precipitates lithium to an anode current collector. Anodeless-type all-solid-state batteries do not use existing anode active material, so that an energy density per unit weight thereof may be greatly improved. In addition, compared with lithium metal batteries having lithium metal as an anode, there are advantages in that the anodeless-type all-solid-state batteries are easily manufactured at low cost.

However, when an anode active material layer and so on are removed and only an anode current collector is used, lithium is not uniformly precipitated and the battery is not reversibly driven. Therefore, the development of technologies that can induce uniform precipitation of lithium is necessary.

The above descriptions regarding background technologies have been made only to help understanding of the background of the present disclosure, and are not to be deemed by those skilled in the art to correspond to already-known prior arts, and should not be taken as acknowledgment that this information forms any part of prior art.

SUMMARY

Accordingly, the present disclosure has been made keeping in mind the above problems occurring in the related art, and an objective of the present disclosure is to provide a composite anode for an anodeless-type all-solid-state battery in which lithium is uniformly precipitated on an anode current collector.

The objective of the present disclosure is not limited to the foregoing. The objective of the present disclosure will be able to be clearly understood through the following description and to be realized by the means described in the claims and combinations thereof.

According to an embodiment of the present disclosure, there is provided an anode for an all-solid-state battery, the anode including: an anode current collector; and a protective layer positioned on the anode current collector, and including a metallic compound and a metal alloyable with lithium, wherein the metallic compound may include at least one selected from the group consisting of a metal oxide, a metal carbide, and a combination thereof.

The metal oxide may include at least one selected from the group consisting of $TiO_2$, $SiO_2$, $ZrO_2$, $Al_2O_3$, and a combination thereof.

The metal carbide may include at least one selected from the group consisting of ZrC, TiC, SiC, and a combination thereof.

An average particle diameter (D50) of the metallic compound may be 10 nm to 2,000 nm.

The metal alloyable with lithium may include at least one selected from the group consisting of gold (Au), platinum (Pt), palladium (Pd), silicon (Si), silver (Ag), aluminum (Al), bismuth (Bi), tin (Sn), zinc (Zn), magnesium (Mg), and a combination thereof.

An average particle diameter (D50) of the metal alloyable with lithium may be 10 nm to 1,000 nm.

The protective layer may include: 20 wt % to 90 wt % of the metallic compound; and 10 wt % to 80 wt % of the metal alloyable with lithium.

The protective layer may further include a binder including at least one selected from the group consisting of butadiene rubber (BR), nitrile butadiene rubber (NBR), hydrogenated nitrile butadiene rubber (HNBR), polyvinylidene difluoride (PVDF), polytetrafluoroethylene (PTFE), carboxymethyl cellulose (CMC), polyethylene oxide (PEO), and a combination thereof.

A thickness of the protective layer may be 0.1 μm to 20 μm.

According to an embodiment of the present disclosure, there is provided an all-solid-state battery, the battery including: a cathode; the anode; and a solid electrolyte layer positioned between the cathode and the anode.

According to an embodiment of the present disclosure, there is provided a method of manufacturing an anode for an all-solid-state battery, the method including: preparing a slurry, the slurry including a metallic compound and a metal alloyable with lithium; and forming a protective layer by applying the slurry onto an anode current collector, wherein the metallic compound may include at least one selected from the group consisting of a metal oxide, a metal carbide, and a combination thereof.

According to the present disclosure, a composite anode for an anodeless-type all-solid-state battery in which lithium is uniformly precipitated on an anode current collector may be realized.

According to the present disclosure, an anodeless-type all-solid-state battery having excellent charge and discharge reversibility may be realized.

The effects of the present disclosure are not limited to the foregoing. The effects of the present disclosure should be understood to include all effects that can be reasonably anticipated from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
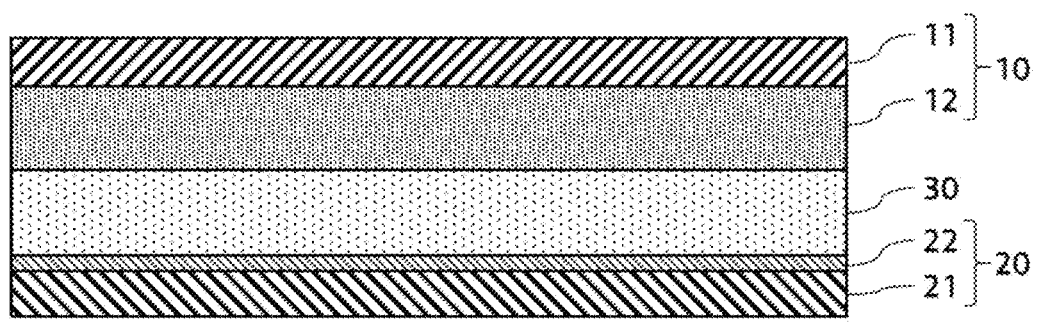
FIG. 1 is a cross-sectional view illustrating an all-solid-state battery according to the present disclosure.

The objectives, features, and advantages of the present disclosure will be easily understood through the following detailed description of specific exemplary embodiments and the attached drawings. However, the present disclosure is not limited to the exemplary embodiments and may be embodied in other forms. On the contrary, the exemplary embodiments are provided so that the disclosure of the present invention may be completely and fully understood by those of ordinary skill.

In the attached drawings, like numerals are used to represent like elements. In the drawings, the dimensions of the elements are enlarged for easier understanding of the present disclosure. Although the terms first, second, etc. may be used to describe various elements, these elements should not be limited by the terms. The terms are used only to distinguish one element from another. For example, a first element can be termed a second element and, similarly, a second element can be termed a first element without departing from the scope of the present disclosure. A singular expression includes a plural expression unless the context clearly indicates otherwise.

In the present disclosure, terms such as "include", "contain", "have", etc. should be understood as designating that features, numbers, steps, operations, elements, parts or combinations thereof exist and not as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" the another element or an intervening element may also be present. Likewise, when an element such as a layer, a film, a region, a substrate, etc. is referred to as being "under" another element, it can be "directly under" the another element or an intervening element may also be present.

Unless specified otherwise, all the numbers, values and/or expressions representing the amount of components, reaction conditions, polymer compositions or mixtures are approximations reflecting various uncertainties of measurement occurring in obtaining those values and should be understood to be modified by "about". Also, unless specified otherwise, all the numerical ranges disclosed in the present disclosure are continuous and include all the values from the minimum values to the maximum values included in the ranges. In addition, when the ranges indicate integers, all the integers from the minimum values to the maximum values included in the ranges are included unless specified otherwise.

FIG. 1 is a cross-sectional view illustrating an all-solid-state battery according to the present disclosure. Referring to FIG. 1, the all-solid-state battery includes: a cathode 10 including a cathode current collector 11 and a cathode active material layer 12; an anode 20 including an anode current collector 21 and a protective layer 22; and a solid electrolyte layer 30 positioned between the cathode 10 and the anode 20.

Cathode

The cathode current collector 11 may be a plate-shaped substrate being electrically conductive. The cathode current collector 11 may include an aluminum foil.

The cathode active material layer 12 may include a cathode active material, a solid electrolyte, a conductive material, a binder, and so on.

In addition, the cathode active material may be an oxide active material or a sulfide active material.

For example, the oxide active material may be a rock-salt-layer-type active material such as $LiCoO_2$, $LiMnO_2$, $LiNiO_2$, $LiVO_2$, $Li_{1+x}Ni_{1/3}Co_{1/3}Mn_{1/3}O_2$, and the like; a spinel-type active material such as $LiMn_2O_4$, $Li(Ni_{0.5}Mn_{1.5})O_4$, and the like; an inverse-spinel-type active material such as $LiNiVO_4$, $LiCoVO_4$, and the like; an olivine-type active material such as $LiFePO_4$, $LiMnPO_4$, $LiCoPO_4$, $LiNiPO_4$, and the like; a silicon-containing active material such as $Li_2FeSiO_4$, $Li_2MnSiO_4$, and the like; a rock-solid-layer-type active material in which a portion of a transition metal is substituted with a different metal, such as $LiNi_{0.8}Co_{(0.2-x)}Al_xO_2$ ($0<x<0.2$); a spinel-type active material in which a portion of a transition metal is substituted with a different metal, such as $Li_{1+x}Mn_{2-x-y}M_yO_4$ (M being at least one of Al, Mg, Co, Fe, Ni, and Zn, $0<x+y<2$); or lithium titanate such as $Li_4Ti_5O_{12}$ and the like.

The sulfide active material may be copper Chevrel, iron sulfide, cobalt sulfide, nickel sulfide, etc.

The solid electrolyte may be an oxide-based solid electrolyte or a sulfide-based solid electrolyte. However, it is preferable to use the sulfide-based solid electrolyte with high lithium-ion conductivity. The sulfide-based solid electrolyte is not particularly limited, and may be $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which m and n are positive numbers, and Z is any one of Ge, Zn, and Ga), $Li_2S$—$GeS_2$, $Li_2S$—

$SiS_2$—$Li_3PO_4$, $Li_2S$—$SiS_2$-$Li_xMO_y$ (in which x and y are positive numbers, and M is any one of P, Si, Ge, B, Al, Ga, and In), $Li_{10}GeP_2S_{12}$, etc.

The conductive material may be carbon black, conducting graphite, ethylene black, graphene, etc.

The binder may be butadiene rubber (BR), nitrile butadiene rubber (NBR), hydrogenated nitrile butadiene rubber (HNBR), polyvinylidene difluoride (PVDF), polytetrafluoroethylene (PTFE), carboxymethyl cellulose (CMC), polyethylene oxide (PEO), or the like.

Anode

The anode 20 includes the anode current collector 21 and the protective layer 22 that is positioned on the anode current collector 21.

The anode current collector 21 may be a plate-shaped substrate being electrically conductive. The anode current collector 21 may include at least one selected from the group consisting of nickel (Ni), stainless steel (SUS), and a combination thereof.

The anode current collector 21 may be a metal thin layer with a high density having a porosity of less than about 1%.

A thickness of the anode current collector 21 may be 1 μm to 20 μm, or 5 μm to 15 μm. If the thickness of the anode current collector 21 exceeds 20 μm, then the energy density decreases.

Figure 2:
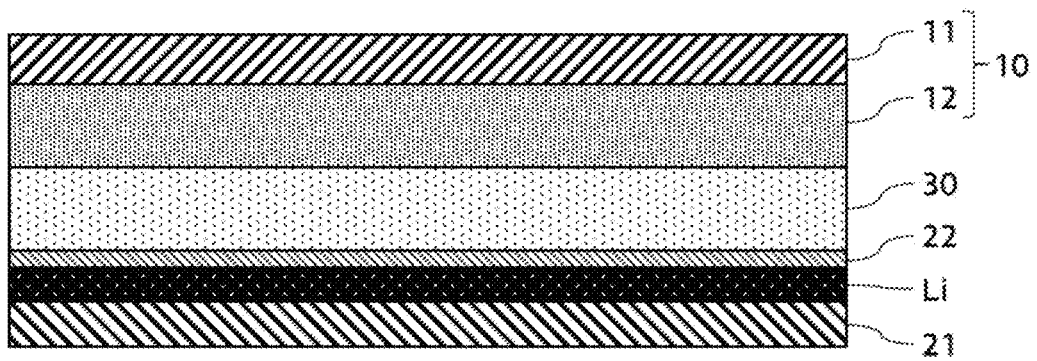
FIG. 2 is a cross-sectional view illustrating a state in which the all-solid-state battery according to the present disclosure is charged.

FIG. 2 is a cross-sectional view illustrating a state in which the all-solid-state battery according to the present disclosure is charged. Referring to FIGS. 1 and 2, lithium ions that have moved from the cathode 10 when the battery was charged are precipitated and stored between the protective layer 22 and the anode current collector 21 in a form of lithium metal (Li).

In an anodeless-type all-solid-state battery, lithium ions are moved from the cathode 10 to the anode current collector 21. The lithium ions are electrochemically reacted with electrons of the anode current collector 21, and are precipitated in the form of lithium metal. When there is no means for inducing lithium ions such as the protective layer 22 on the anode current collector 21 and when the anode current collector 21 is directly in contact with the solid electrolyte layer 30, the precipitation of lithium begins only at a local portion at which solid electrolyte particles positioned on a surface of the solid electrolyte layer 30 and the anode current collector 21 are in contact with each other. As a result, lithium dendrite may grow and cause a short circuit of a battery.

In order to prevent the situation mentioned above, the present disclosure includes the protective layer 22 that may capable of filling a space between the solid electrolyte layer 30 and the anode current collector 21, and also may capable of uniformly inducing lithium ions.

The protective layer 22 may include a metallic compound and a metal alloyable with lithium.

The metallic compound may include a material having a lithium-ion conductivity while not physically/chemically reacting with a solid electrolyte. Specifically, the metallic compound may include at least one selected from the group consisting of a metal oxide, a metal carbide, and a combination thereof.

The metal oxide may include at least one selected from the group consisting of $TiO_2$, $SiO_2$, $ZrO_2$, $Al_2O_3$, and a combination thereof.

The metal carbide may include at least one selected from the group consisting of ZrC, TiC, SiC, and a combination thereof.

An average particle diameter (D50) of the metallic compound may be 10 nm to 2,000 nm. The metal carbide is a material for forming an interface with the solid electrolyte layer 30. In order to form a uniform interface with the sold electrolyte layer 30, it is suitable that the size of the metal carbide is the same as or smaller than that of the solid electrolyte. If the average particle diameter (D50) of the metallic compound exceeds 2,000 nm, then the interface with the solid electrolyte layer 30 may not be uniformly formed.

The metal alloyable with lithium is configured to induce lithium ions so that the lithium ions may more uniformly precipitated on the anode current collector 21.

The metal alloyable with lithium may include at least one selected from the group consisting of gold (Au), platinum (Pt), palladium (Pd), silicon (Si), silver (Ag), aluminum (Al), bismuth (Bi), tin (Sn), zinc (Zn), magnesium (Mg), and a combination thereof.

An average particle diameter (D50) of the metal alloyable with lithium may be 10 nm to 1,000 nm. If the average particle diameter (D50) of the metal alloyable with lithium exceeds 1,000 nm, then the interface with the solid electrolyte layer 30 may not be uniformly formed and the volume of alloy may expand excessively.

The protective layer 22 may include 20 wt % to 90 wt % of the metallic compound and 10 wt % to 80 wt % of the metal alloyable with lithium. In addition, the protective layer 22 may include 50 wt % to 90 wt % of the metallic compound and 10 wt % to 50 wt % of the metal alloyable with lithium. In addition, the protective layer 22 may include 70 wt % to 90 wt % of the metallic compound and 10 wt % to 30 wt % of the metal alloyable with lithium. When the content of the metal alloyable with lithium is excessively low (e.g., less than 10% wt %), lithium ions may not be properly induced, so that formation of lithium dendrite may be prevented.

The protective layer 22 may further include a binder.

The binder is configured to combine a metallic compound, a metal alloyable with lithium, and so on. The binder may include at least one selected from the group consisting of butadiene rubber (BR), nitrile butadiene rubber (NBR), hydrogenated nitrile butadiene rubber (HNBR), polyvinylidene difluoride (PVDF), polytetrafluoroethylene (PTFE), carboxymethyl cellulose (CMC), polyethylene oxide (PEO), and a combination thereof.

The content of the binder is not particularly limited, but may be in an amount of 1 wt % to 20 wt %, based on 100 wt % of the sum of the metallic compound and the metal alloyable with lithium contents.

A thickness of the protective layer 22 may be 0.1 μm to 20 μm. If the thickness of the protective layer 22 is less than 0.1 μm, the uniform precipitation of lithium ions may be difficult to be performed. If the thickness of the protective layer 22 exceeds 20 μm, the movement of lithium ions within the protective layer 22 may not be smoothly performed.

A method of manufacturing the anode 20 according to the present disclosure may include: preparing a slurry, the slurry including the metallic compound and the metal alloyable with lithium; and forming the protective layer 22 by applying the slurry onto the anode current collector 21.

The slurry may be prepared by adding the metallic compound and the metal alloyable with lithium to a solvent.

The solvent is not particularly limited, and may include N-methyl-2pyrrolidone (NMP).

A method of applying the slurry to form the protective layer 22 is not specifically limited. The method of applying the slurry may be doctor blade casting, spray coating, and so on.

Solid Electrolyte Layer

The solid electrolyte layer 30 is positioned between the cathode 10 and the anode 20, and is configured to allow lithium ions to move between the cathode 10 and the anode 20.

The solid electrolyte layer 30 may include an oxide-based solid electrolyte or a sulfide-based solid electrolyte. However, it is preferable to use the sulfide-based solid electrolyte with high lithium-ion conductivity. The sulfide-based solid electrolyte is not particularly limited, and may be $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which m and n are positive numbers, and Z is any one of Ge, Zn, and Ga), $Li_2S$—$GeS_2$, $Li_2S$—$SiS_2$—$Li_3PO_4$, $Li_2S$—$SiS_2$-$Li_xMO_y$, (in which x and y are positive numbers, and M is any one of P, Si, Ge, B, Al, Ga, and In), $Li_{10}GeP_2S_{12}$, etc.

Hereinafter, the present disclosure will be described more specifically through examples. However, these examples are provided only for the understanding of the present disclosure, and the scope of the present disclosure is not limited to these examples.

Example 1

$TiO_2$ was used as a metal compound, and silver (Ag) was used as a metal alloyable with lithium. Specifically, $TiO_2$ powder, silver (Ag) powder, and PVDF as a binder are dispersed in NMP that is a solvent, so that a slurry is prepared. The slurry was applied to an anode current collector, so that a protective layer is formed. A content of silver (Ag) in the protective layer was about 30 wt %.

Figure 3:
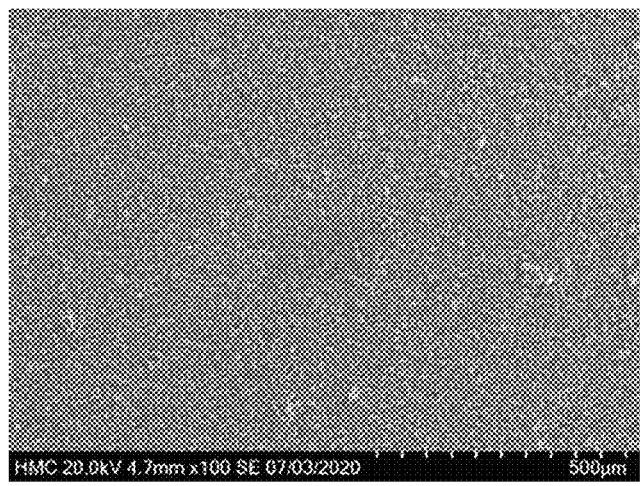
FIG. 3 is an image showing a result of analyzing a surface of a protective layer according to Example 1 by using a scanning electron microscope (SEM)

A surface of the protective layer according to the Example 1 was analyzed by using a scanning electron microscope (SEM). The result of the analysis is the same as illustrated in FIG. 3.

Example 2

The same procedure as in the Example 1 was performed to form a protective layer on an anode current collector, except that ZrC as a metallic compound was used.

Comparative Example 1

The same procedure as in the Example 1 was performed to form a protective layer on an anode current collector, except that a metal alloyable with lithium was not used.

Comparative Example 2

The same procedure as in the Example 2 was performed to form a protective layer on an anode current collector, except that a metal alloyable with lithium was not used.

Experimental Example—Evaluation of Half-Cell Characteristics

Anodes according to the Example 1, the Example 2, the Comparative Example 1, and the Comparative Example 2 were used to evaluate half-cell characteristics. In order to perform the evaluations of half-cell characteristics, a current density and a deposition capacity were fixed at 1.175 $mA/cm^2$ and 2.35 $mAh/cm^2$, respectively. Specifically, after the lithium ions were uniformly stored to a capacity of 2.35 $mA/cm^2$ during a discharge process, and then a performance of the protective layer was evaluated by checking a capacity that lithium deposited during the discharge process was reversibly returned.

Figure 4:
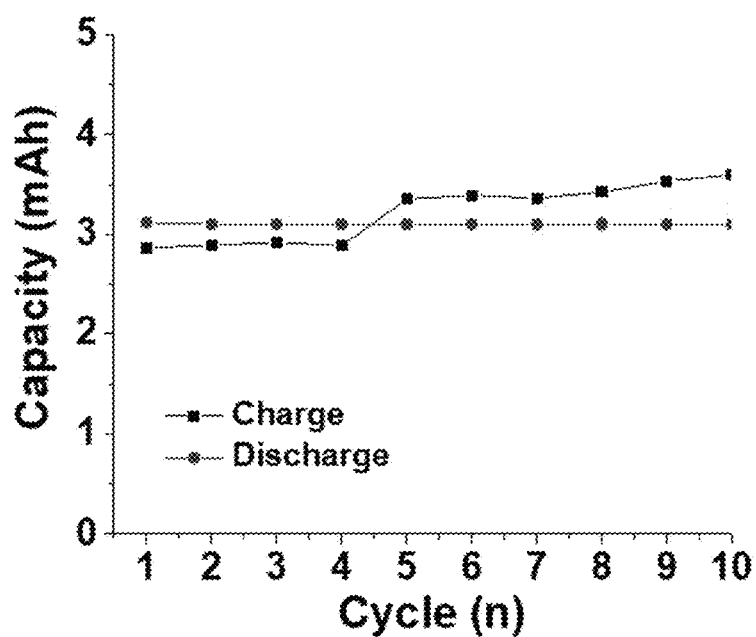
FIG. 4 is a graph showing a result of evaluating half-cell characteristics with respect to an anode of Comparative Example 1.

FIG. 4 is a graph showing a result of evaluating half-cell characteristics with respect to an anode of Comparative Example 1. Referring to FIG. 4, when $TiO_2$ is used alone without using silver (Ag), it can be seen that overcharging has occurred from a fifth charge cycle. This is a typical phenomenon that occurs when lithium metal has penetrated into a solid electrolyte layer.

Figure 5:
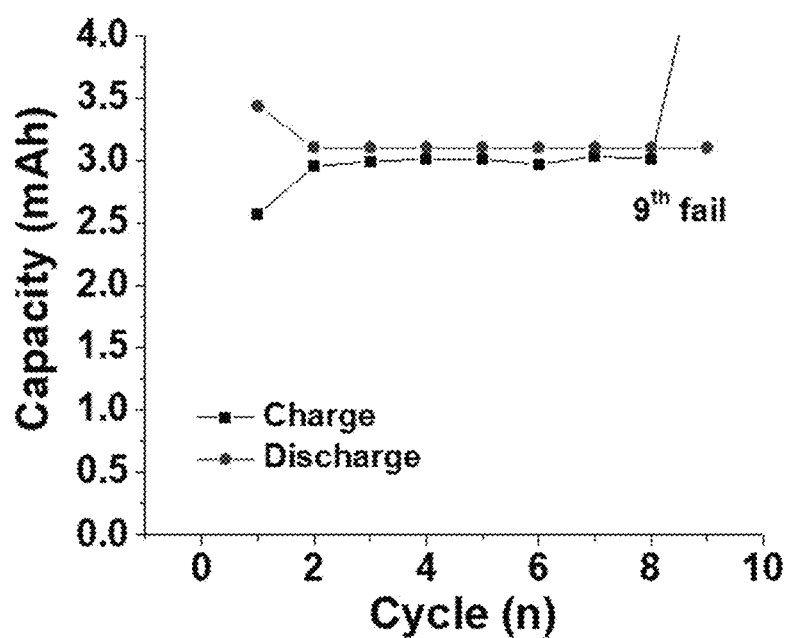
FIG. 5 is a graph showing a result of evaluating half-cell characteristics with respect to an anode of Comparative Example 2.

FIG. 5 is a graph showing a result of evaluating half-cell characteristics with respect to an anode of Comparative Example 2. Referring to FIG. 5, when ZrC is used alone without using silver (Ag), it can be seen that overcharging has occurred from a ninth charge cycle, which is the same phenomenon as in the Comparative Example 1.

Figure 6:
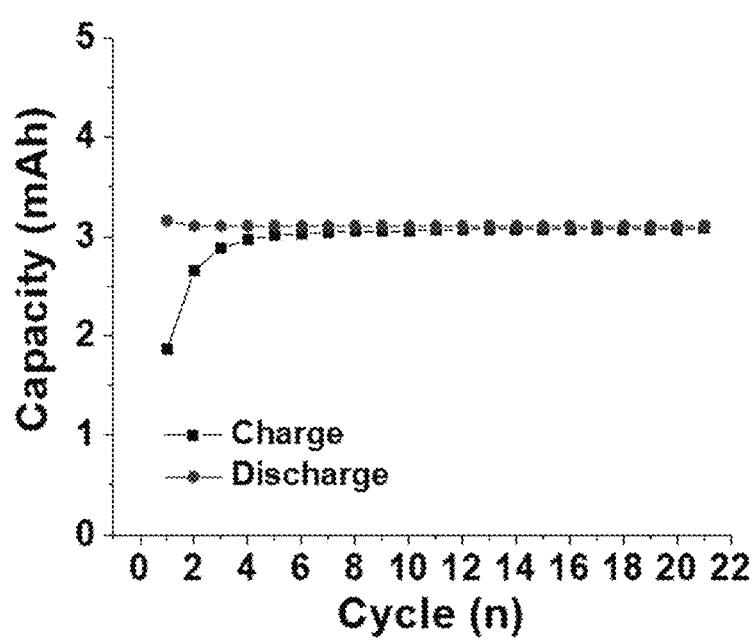
FIG. 6 is a graph showing a result of evaluating half-cell characteristics with respect to an anode of Example 1.

FIG. 6 is a graph showing a result of evaluating half-cell characteristics with respect to an anode of Example 1. Referring to FIG. 6, when silver (Ag) is used with $TiO_2$, it can be seen that 20 or more cycles of charging and discharging may be stably performed. In particular, even after 20 cycles of charging and discharging, the capacity was maintained at 99.5%, showing a very high level of reversibility.

Figure 7:
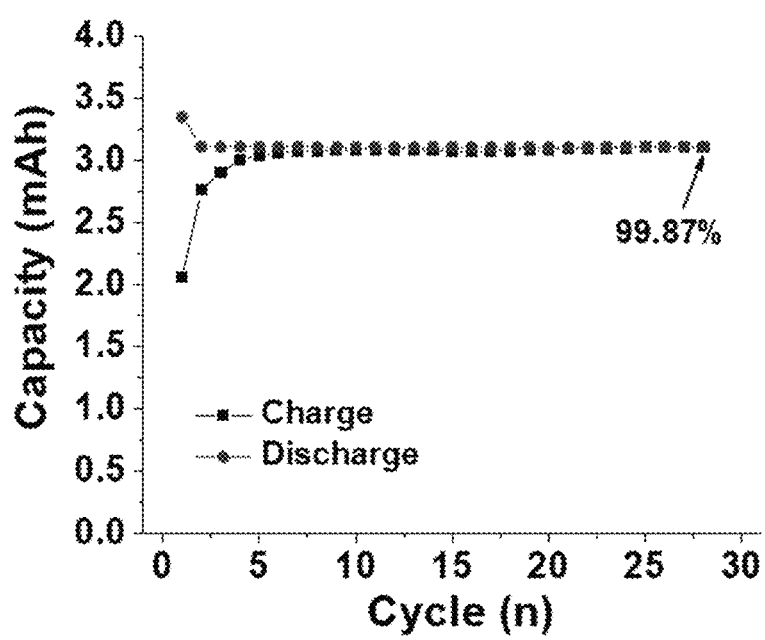
FIG. 7 is a graph showing a result of evaluating half-cell characteristics with respect to an anode of Example 2.

FIG. 7 is a graph showing a result of evaluating half-cell characteristics with respect to an anode of Example 2. Referring to FIG. 7, when silver (Ag) is used with ZrC, it can be seen that or more cycles of charging and discharging may be stably performed. In the Example 2, even after 25 cycles of charging and discharging, it can be seen that the capacity was maintained at 99.9%.

When a metallic compound that does not react with a solid electrolyte and has a lithium-ion conductivity and a metal that is capable of inducing a uniform deposition of lithium are used together, which is as in the present disclosure, an anodeless-type all-solid-state battery in which lithium is uniformly precipitated and stored on an anode current collector may be realized.

As described above, while the experimental example and the embodiments of the present disclosure have been specifically described, the scope of the present disclosure is not limited to the above-disclosed experimental example and embodiments, and various modifications and improvements of those skilled in the art using the basic concept of the present disclosure, which is defined in the appended claims, are also included in the scope of the present disclosure.

What is claimed is:

1. An anode for an all-solid-state battery, the anode comprising:
   an anode current collector; and
   a protective layer positioned on the anode current collector, and comprising a metallic compound and a metal alloyable with lithium,
   wherein the metallic compound comprises at least one selected from the group consisting of a metal oxide, a metal carbide, and a combination thereof, and
   wherein the protective layer comprises:
      50 wt % to 90 wt % of the metallic compound; and
      10 wt % to 50 wt % of the metal alloyable with lithium.

2. The anode of claim 1, wherein the metal oxide comprises at least one selected from the group consisting of $TiO_2$, $SiO_2$, $ZrO_2$, $Al_2O_3$, and a combination thereof.

3. The anode of claim 1, wherein the metal carbide comprises at least one selected from the group consisting of ZrC, TiC, SiC, and a combination thereof.

4. The anode of claim 1, wherein an average particle diameter (D50) of the metallic compound is 10 nm to 2,000 nm.

5. The anode of claim 1, wherein the metal alloyable with lithium comprises at least one selected from the group consisting of gold (Au), platinum (Pt), palladium (Pd), silicon (Si), silver (Ag), aluminum (Al), bismuth (Bi), tin (Sn), zinc (Zn), magnesium (Mg), and a combination thereof.

6. The anode of claim 1, wherein an average particle diameter (D50) of the metal alloyable with lithium is 10 nm to 1,000 nm.

7. The anode of claim 1, wherein the protective layer further comprises a binder comprising at least one selected from the group consisting of butadiene rubber (BR), nitrile butadiene rubber (NBR), hydrogenated nitrile butadiene rubber (HNBR), polyvinylidene difluoride (PVDF), polytetrafluoroethylene (PTFE), carboxymethyl cellulose (CMC), polyethylene oxide (PEO), and a combination thereof.

8. The anode of claim 1, wherein a thickness of the protective layer is 0.1 μm to 20 μm.

9. An all-solid-state battery, the battery comprising:
a cathode;
the anode of claim 1; and
a solid electrolyte layer positioned between the cathode and the anode.

10. A method of manufacturing an anode for an all-solid-state battery, the method comprising:
preparing a slurry comprising a metallic compound and a metal alloyable with lithium; and
forming a protective layer by applying the slurry onto an anode current collector,
wherein the metallic compound comprises at least one selected from the group consisting of a metal oxide, a metal carbide, and a combination thereof, and
wherein the protective layer comprises:
50 wt % to 90 wt % of the metallic compound; and
10 wt % to 50 wt % of the metal alloyable with lithium.

11. The method of claim 10, wherein the metal oxide comprises at least one selected from the group consisting of $TiO_2$, $SiO_2$, $ZrO_2$, $Al_2O_3$, and a combination thereof.

12. The method of claim 10, wherein the metal carbide comprises at least one selected from the group consisting of ZrC, TiC, SiC, and a combination thereof.

13. The method of claim 10, wherein an average diameter of the metallic compound (D50) is 10 nm to 2,000 nm.

14. The method of claim 10, wherein the metal alloyable with lithium comprises at least one selected from the group consisting of gold (Au), platinum (Pt), palladium (Pd), silicon (Si), silver (Ag), aluminum (Al), bismuth (Bi), tin (Sn), zinc (Zn), magnesium (Mg), and a combination thereof.

15. The method of claim 10, wherein an average particle diameter (D50) of the metal alloyable with lithium is 10 nm to 1,000 nm.

16. The method of claim 10, wherein the protective layer further comprises a binder comprising at least one selected from the group consisting of butadiene rubber (BR), nitrile butadiene rubber (NBR), hydrogenated nitrile butadiene rubber (HNBR), polyvinylidene difluoride (PVDF), polytetrafluoroethylene (PTFE), carboxymethyl cellulose (CMC), polyethylene oxide (PEO), and a combination thereof.

17. The method of claim 10, wherein a thickness of the protective layer is 0.1 μm to 20 μm.

* * * * *